(12) United States Patent
Itabayashi et al.

(10) Patent No.: US 11,669,649 B2
(45) Date of Patent: Jun. 6, 2023

(54) SUPPORT DEVICE

(71) Applicant: Hitachi, Ltd., Tokyo (JP)

(72) Inventors: Yuki Itabayashi, Tokyo (JP); Makoto Onodera, Tokyo (JP); Yuuki Shimizu, Tokyo (JP); Akira Kamei, Tokyo (JP); Masayuki Hariya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 226 days.

(21) Appl. No.: 17/121,793

(22) Filed: Dec. 15, 2020

(65) Prior Publication Data

US 2021/0216673 A1     Jul. 15, 2021

(30) Foreign Application Priority Data

Jan. 14, 2020    (JP) .............................. JP2020-003780

(51) Int. Cl.
     *G06F 30/10*      (2020.01)
     *G06F 111/02*      (2020.01)
     *G06F 30/15*      (2020.01)
     *G06F 111/10*      (2020.01)

(52) U.S. Cl.
     CPC .............. *G06F 30/10* (2020.01); *G06F 30/15* (2020.01); *G06F 2111/02* (2020.01); *G06F 2111/10* (2020.01)

(58) Field of Classification Search
     CPC ...... G06F 30/10; G06F 30/15; G06F 2111/02; G06F 2111/10; G06F 30/00
     USPC ............................................................. 703/1
     See application file for complete search history.

(56) References Cited

FOREIGN PATENT DOCUMENTS

JP      2019-082874 A     5/2019
WO     WO2015132836 A1 *   9/2015

OTHER PUBLICATIONS

Hariya, Masayuki, et al. "Technique for checking design rules for three-dimensional CAD data." 2010 3rd International Conference on Computer Science and Information Technology. vol. 1. IEEE, 2010. (Year: 2010).*
Okada, Kazunori, et al. "Noninvasive differential diagnosis of dental periapical lesions in cone-beam CT scans." Medical Physics 42.4 (2015): 1653-1665. (Year: 2015).*
Cohen, Tal, Shamkant B. Navathe, and Robert E. Fulton. "C-FAR, change favorable representation." Computer-aided design 32.5-6 (2000): 321-338. (Year: 1999).*
Gueutal, Hal G., Nancy Surprenant, and Kenneth Bubeck. "Effectively utilizing computer-aided design technology: The role of individual difference variables." (1984). (Year: 1984).*

(Continued)

*Primary Examiner* — Brian S Cook
(74) *Attorney, Agent, or Firm* — Mattingly & Malur, PC (57) ABSTRACT

A design support device includes a unit that accepts registration of normal CAD data with a past record and violation CAD data determined to have violated portion with respect to three-dimensional CAD data, a unit that acquires a parameter related to a design rule from CAD data to be evaluated, a unit that calculates a statistical value of the acquired parameter and calculates a value of an influence degree t that explains a violation of each parameter, and a unit that presents a scatter diagram plotting normal CAD data and violation CAD data to be evaluated and a boundary line subjected to cluster analysis, on a two-dimensional coordinate system, according to a combination of parameters designated by a user (evaluator).

8 Claims, 10 Drawing Sheets

(56) References Cited

OTHER PUBLICATIONS

Martínez-Murcia, Francisco Jesús, et al. "Computer aided diagnosis tool for Alzheimer's disease based on Mann-Whitney-Wilcoxon U-test." Expert Systems with Applications 39.10 (2012): 9676-9685. (Year: 2012).*

Masayuki Hariya, et al., "Technique for Checking Design Rules for Three-Dimensional CAD Data", Computer Science and Information Technology (ICCSIT), 2010 3rd IEEE International Conference on, IEEE, 2010, pp. 296-300.

* cited by examiner

| ID | CAD DATA NAME | SHAPE TYPE | PARAMETER 1 HEIGHT | PARAMETER 2 ANGLE | PARAMETER ... | PARAMETER N |
|---|---|---|---|---|---|---|
| 1 | A01 | NORMAL | 0.65 | 5.71 | | |
| 2 | A02 | NORMAL | 0.52 | 2.23 | | |
| 3 | A03 | NORMAL | 0.51 | 1.05 | | |
| 4 | A04 | NORMAL | 0.69 | 5.22 | | |
| 5 | B01 | VIOLATION | 0.31 | 2.51 | | |
| 6 | B02 | NORMAL | 0.55 | 5.98 | | |
| 7 | B03 | VIOLATION | 0.29 | 3.98 | | |
| 8 | B04 | NORMAL | 0.61 | 2.67 | | |
| 9 | C01 | NORMAL | 0.59 | 5.45 | | |
| 10 | C02 | VIOLATION | 0.32 | 2.22 | | |

| ID | CAD DATA NAME | SHAPE TYPE | PARAMETER 1 MOUNTING HEIGHT | PARAMETER 2 MOUNTING ANGLE |
|---|---|---|---|---|
| 1 | 5A1 | NORMAL | 0.55 | 0.00 |
| 2 | 5B2 | VIOLATION | 0.40 | 6.10 |
| 3 | 5C3 | NORMAL | 0.61 | 7.10 |
| 4 | 5D4 | NORMAL | 0.52 | 2.05 |
| 5 | 5E5 | NORMAL | 0.50 | 1.00 |
| 6 | 5F6 | VIOLATION | 0.38 | 3.25 |

| ID | CAD DATA NAME | SHAPE TYPE | PARAMETER 1 MOUNTING HEIGHT | PARAMETER 2 MOUNTING ANGLE | PARAMETER 3 CURVATURE OF DOOR HANDLE MOUNTING SURFACE | PARAMETER 4 PLATE THICKNESS OF DOOR | PARAMETER 5 MATERIAL 1 OF DOOR | PARAMETER 6 MATERIAL 2 OF DOOR HANDLE | PARAMETER 7 SHORTEST DISTANCE TO DOOR END | PARAMETER 8 SHORTEST DISTANCE TO DOOR HINGE |
|----|------|------|------|------|------|------|------|------|------|------|
| 1  | A601 | NORMAL    | 0.55 | 0.00 | 0.002 | 2.5 | Al ALLOY | PC  | 10.2 | 860.5 |
| 2  | A602 | VIOLATION | 0.40 | 6.10 | 0.002 | 2.5 | Al ALLOY | PC  | 8.51 | 650.5 |
| 3  | A603 | NORMAL    | 0.61 | 7.10 | 0.002 | 2.5 | Al ALLOY | PC  | 12.4 | 890.5 |
| 4  | B604 | NORMAL    | 0.52 | 2.05 | 0.0   | 2.5 | Al ALLOY | PC  | 11.1 | 650.5 |
| 5  | B605 | NORMAL    | 0.50 | 1.00 | 0.0   | 2.5 | Al ALLOY | PC  | 11.1 | 650.5 |
| 6  | B606 | VIOLATION | 0.38 | 3.25 | 0.0   | 2.5 | Al ALLOY | PC  | 11.1 | 650.5 |
| 7  | C607 | NORMAL    | 0.65 | 3.05 | 0.0   | 2.5 | Al ALLOY | PBT | 15.3 | 783.0 |
| 8  | C608 | VIOLATION | 0.33 | 4.00 | 0.0   | 2.5 | Al ALLOY | PBT | 15.3 | 783.0 |
| 9  | C609 | VIOLATION | 0.35 | 5.50 | 0.0   | 2.5 | Al ALLOY | PBT | 15.3 | 783.0 |
| 10 | D610 | VIOLATION | 0.29 | 4.25 | 0.001 | 2.5 | Al ALLOY | PBT | 6.55 | 960.0 |
| 11 | D611 | NORMAL    | 6.00 | 2.89 | 0.001 | 2.5 | Al ALLOY | PBT | 10.5 | 960.0 |
| 12 | D612 | NORMAL    | 5.67 | 6.00 | 0.001 | 2.5 | Al ALLOY | PBT | 16.7 | 960.0 |
| 13 | E613 | VIOLATION | 0.39 | 2.21 | 0.001 | 2.5 | Al ALLOY | POM | 8.50 | 880.0 |
| 14 | E614 | NORMAL    | 0.68 | 6.85 | 0.005 | 2.5 | Al ALLOY | POM | 12.7 | 880.0 |

SUPPORT DEVICE

CROSS-REFERENCE TO RELATED APPLICATION

The present application claims priority from Japanese application JP2020-003780, filed on Jan. 14, 2020, the contents of which is hereby incorporated by reference into this application.

BACKGROUND OF THE INVENTION

1. Field of the Invention

The present invention relates to a technique for creating design data of a product, and relates to a design support device for automatically extracting design rules for detecting a portion where shape data does not satisfy the design rules.

2. Description of the Related Art

In product design, three-dimensional CAD (Computer Aided Design) has become widespread as a design tool. The three-dimensional CAD (hereinafter, referred to as CAD) is a tool for creating a product shape on a computer, and the shape can be freely defined according to the designer's intention. In product design, it is necessary to define a shape satisfying multiple requirements by trial and error in consideration of manufacturing requirements for machine tools and production technology, safety due to strength and temperature, operability due to ease of operation and removal, and maintainability. The rules that the designer should follow are called design rules herein. There is a technique described in "Technique for checking design rules for three-dimensional CAD data" (HARIYA, M, et al., Computer Science and Information Technology (ICCSIT), 2010 3rd IEEE International Conference on, IEEE, 2010, pp. 296-300) as a technique for automatically checking this design rule on CAD and highlighting a violating part.

Further, there is an invention disclosed in JP 2019-082874 A regarding a technique for visualizing a good design proposal as well as a violated portion in product design. JP 2019-082874 A is a design support device having a function of learning a design space composed of parameters permitted in manufacturing by machine learning for design data constituting a product or service and creating highly accurate learning data. By preparing multiple input data in a simulation using a simulation model and importing the results as teacher data for learning, normal clusters or abnormal clusters can be displayed to be identified on the basis of past actual data to the designer. Thus, the parameters based on past record data are presented, which makes it possible to create normal and useful design data.

SUMMARY OF THE INVENTION

However, the above technique has the following problems.

In the techniques described in "Technique for checking design rules for three-dimensional CAD data" (HARIYA, M, et al., Computer Science and Information Technology (ICCSIT), 2010 3rd IEEE International Conference on, IEEE, 2010, pp. 296-300) and JP 2019-082874 A, it is necessary to designate thresholds of parameters (dimensional values such as distance, position, curvature, angle, etc., and attribute values such as materials, manufacturing factory, etc.) and a possible range of the thresholds in advance. However, some thresholds are ambiguous, and it may not be possible to uniquely designate the threshold. For example, the target parts or structures such as "the steering wheel of the automobile door should be arranged in a position where it is easy to open and close" and "the display should be installed in a position where it is easy for the operator to see" are clear, and the types of parameters of the design rule are clear, but the thresholds thereof may not be quantified. Inexperienced designers need to quantify the threshold for such ambiguous design rules by comparing it with past models or interviewing veteran designers, which may be troublesome to check.

Furthermore, some machine tools, materials, processing methods, program versions, design trends, etc. change according to age and time, so even if the design rules are quantified once, they need to be continuously reviewed. It is a very time-consuming and labor-intensive task.

The invention has been made in view of the above problems, and an object of the invention is to improve the efficiency of quantification of ambiguous design rules.

A preferred example of a design support device of the invention is configured to include a unit that accepts registration of normal CAD data with a past record and violation CAD data determined to have violated portion with respect to three-dimensional CAD data, a unit that acquires a parameter related to a design rule from CAD data to be evaluated, a unit that calculates a statistical value of the acquired parameter and calculates a value of an influence degree t that explains a violation of each parameter, and a unit that presents a scatter diagram plotting normal CAD data and violation CAD data to be evaluated and a boundary line subjected to cluster analysis, on a two-dimensional coordinate system, according to a combination of parameters designated by a user (evaluator).

In addition, as another feature of the invention, the design support device includes a unit that presents the scatter diagram and the boundary line subjected to the cluster analysis to a user, and according to evaluation by the user, registers a combination of parameters adopted in the two-dimensional coordinate system and the boundary line as a threshold of a design rule in a design rule database.

Further, as still another feature of the invention, the design support device includes a unit that is configured to present a list of influence degree t values of each parameter to the user after calculating the influence degree t value explaining the violation of each parameter, and when the user preferentially selects a parameter with a high influence degree t to designate any combination of parameters, calculate a scatter diagram plotting the normal CAD data and the violation CAD data to be evaluated and a boundary line subjected to the cluster analysis, on a two-dimensional coordinate system with one parameter on a vertical axis and the other parameter on a horizontal axis, according to the combination of parameters designated by the user.

Ambiguous design rules can be efficiently quantified by statistically extracting a possible range of parameters from the parameters of a normal CAD data group and a violation CAD data group, and calculating and presenting a threshold.

DESCRIPTION OF THE PREFERRED EMBODIMENTS

Hereinafter, an example of a design support device of the invention will be described with reference to the drawings.

First Embodiment

Figure 1:
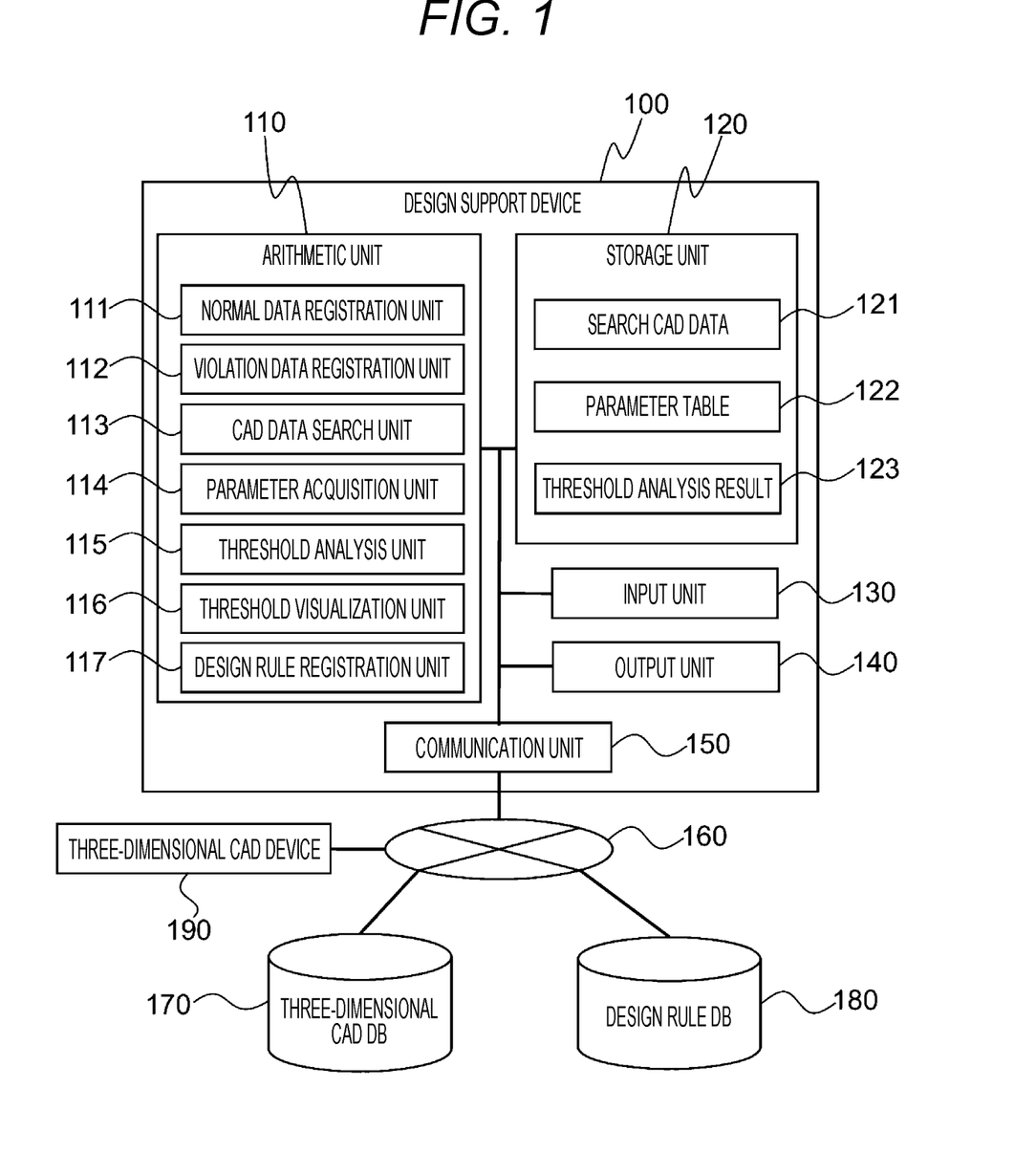
FIG. 1 is an example of a configuration diagram of a design support device.

FIG. 1 is a configuration diagram of a design support device according to this embodiment.

A design support device 100 can be configured on a general-purpose computer, and includes hardware configurations such as an arithmetic unit 110 configured by a CPU (Central Processing Unit), a RAM (Random Access Memory), a storage unit 120 configured by an SSD (Solid State Drive) using a ROM (Read Only Memory), an HDD (Hard Disk Drive), and a flash memory, an input unit 130 configured by input devices such as keyboard and mouse, an output unit 140 configured by an LCD (Liquid Crystal Display), a display device such as an organic EL display, and various types of output devices, and a communication unit 150 configured by a NIC (Network Interface Card).

The communication unit 150 is connected to a three-dimensional CAD database 170, a design rule database 180, and an external three-dimensional CAD device 190, which are shared with an external system via the network 160.

The arithmetic unit 110 realizes the following functional units by loading a design support processing program (not illustrated) stored in the storage unit 120 into the RAM and executing it on the CPU. The arithmetic unit 110 includes a normal data registration unit 111 that registers a shape with a past record as normal CAD data with respect to a target part or structure of the design rule to be quantified, a violation data registration unit 112 that registers a shape having a violated portion as violation CAD data, a CAD data search unit 113 that searches target normal CAD data and the violation CAD data of the design rule to be quantified from the three-dimensional CAD database 170, a parameter acquisition unit 114 that acquires shape dimension values and attribute values as parameter data in CAD data searched by the CAD data search unit, a threshold analysis unit 115 that calculates thresholds for acquired parameters based on a statistical method, a threshold visualization unit 116 that visualizes the results of the threshold analysis process, and a design rule registration unit 117 that registers the results of the threshold analysis process in the design rule database 180 according to the judgment of an evaluator.

A three-dimensional CAD system and other systems may coexist on the computer on which the design support device 100 is mounted.

Hereinafter, the processing of each functional unit of the arithmetic unit will be described. In this embodiment, it will be described for the purpose of quantifying the threshold of the design rule regarding "the door handle for automobiles should be arranged at a position where it is easy to open and close".

(1) Normal Data Registration Unit 111

In order to quantify the design rule that "the door handle for automobiles should be arranged at a position where it is easy to open and close", plural pieces of normal CAD data including the parts of the door handle are registered in the three-dimensional CAD database 170. Here, the normal CAD data is CAD data that has been commercialized in the past. The CAD data already registered from the three-dimensional CAD device may also be regarded as normal CAD data. It is assumed that attribute information such as vehicle type and destination (for Europe, US, Asia, etc.) is added to each CAD data.

Figure 2:
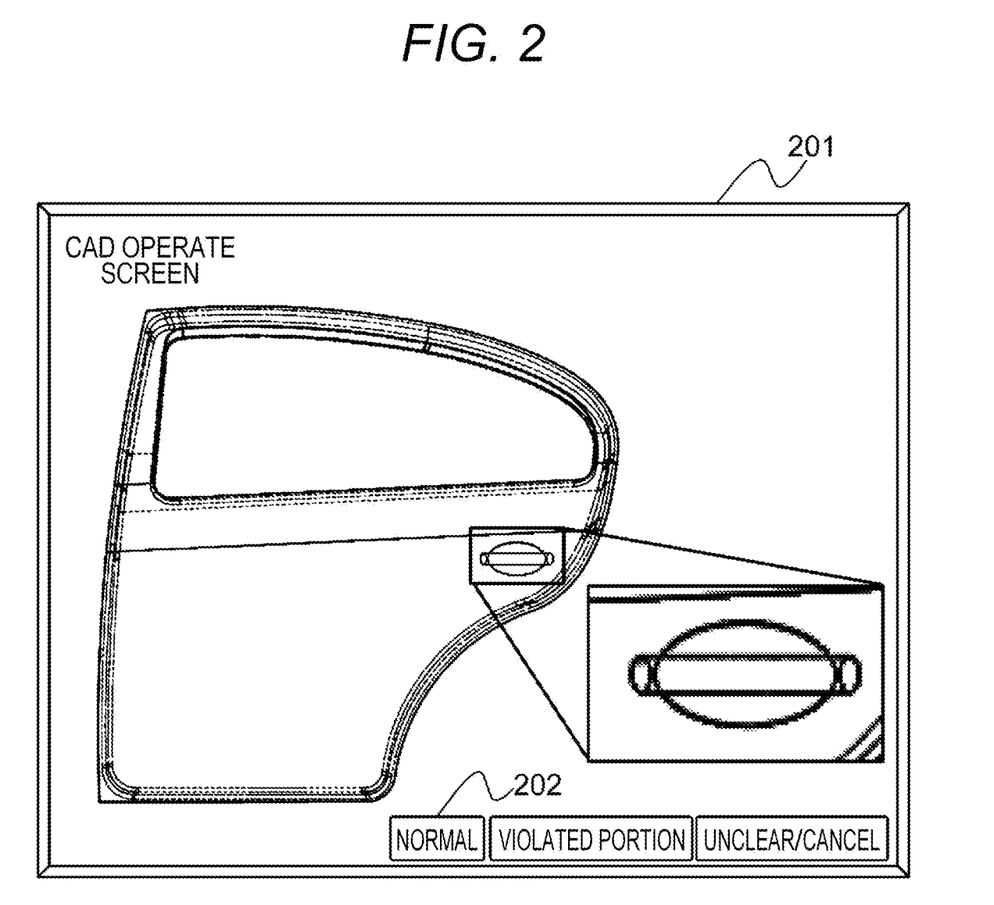
FIG. 2 is a diagram for explaining a screen example for registering normal CAD data.

The normal data registration unit 111 may perform a registration process as normal CAD data by pressing a registration button 202 on a CAD operate screen 201 newly designed by the three-dimensional CAD device as illustrated in FIG. 2.

(2) Violation Data Registration Unit 112

The violation data registration unit 112 registers a plurality of violation CAD data including the parts of the door handle in the three-dimensional CAD database 170. Here, the violation CAD data is, for example, CAD data that has been determined to include a violation by a DR or an internal reviewing meeting in the past.

Figure 3:
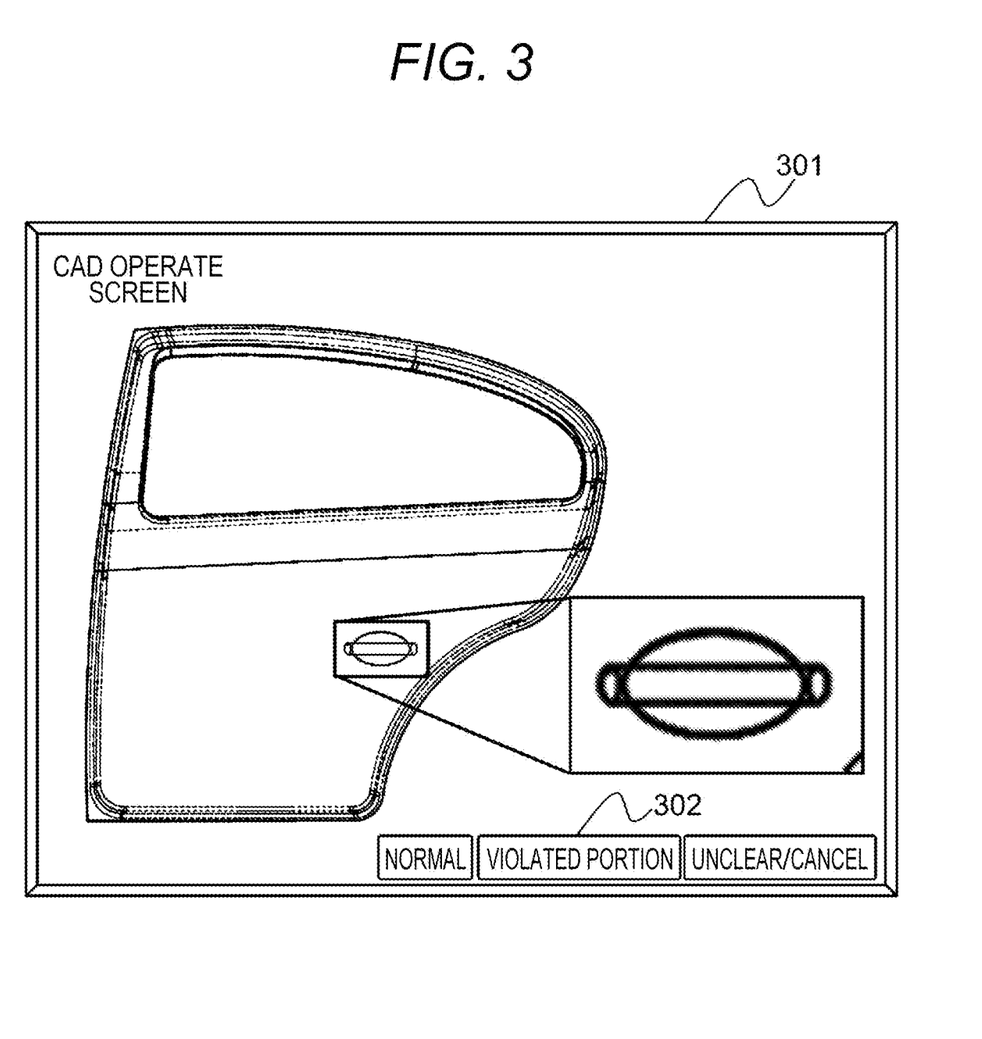
FIG. 3 is a diagram for explaining a screen example for registering violation CAD data.

For example, the CAD data of the door as illustrated in the CAD operate screen 301 illustrated in FIG. 3 newly designed by the three-dimensional CAD device is presented to the output unit 140 of the design support device to be judged by a veteran designer having gained experience about whether it is normal or violated. The portion judged as violated is added with a label of violation CAD and registered as violation CAD data in the three-dimensional CAD database 170 when the violated portion button 302 is pressed. At this time, a plurality of CAD data having different door handle positions may be automatically generated by automatically changing the door handle position. When the number of registered violation CAD data is small, CAD data determined to have a problem in manufacturability may be registered from the execution result of software for checking the quality of manufacturability or the manufacturing simulator.

(3) CAD Data Search Unit 113

When quantifying the design rule that "the door handle for automobiles should be arranged at a position where it is easy to open and close", the user uses the input unit 130 to designate the attribute information such as a vehicle type and destination (for Europe, the United States, and Asia) and specifies a target, and searches the normal CAD data including door handle parts and the violation CAD data from the three-dimensional CAD database 170. The CAD data search unit 113 stores the searched CAD data in the search CAD data 121 of the storage unit 120.

(4) Parameter Acquisition Unit 114

The parameter acquisition unit 114 acquires various parameters instructed by the user for the normal CAD data and the violation CAD data stored in the search CAD data 121 as digital data that can be quantitatively handled as the threshold of the design rule. In this embodiment, dimensional parameters that are designated when creating CAD data such as length, distance, thickness, angle, radius/diameter, curvature, position, and orientation, shape characteristic parameters such as volume, area, center of gravity, and secondary moment of cross section, attribute parameters such as material, material constants, surface treatment, manufacturing bases, shipping areas, suppliers, and cost, and number parameters such as the number of feature shapes such as holes/bosses and the number of interferences are collectively used as parameters.

Figure 4:
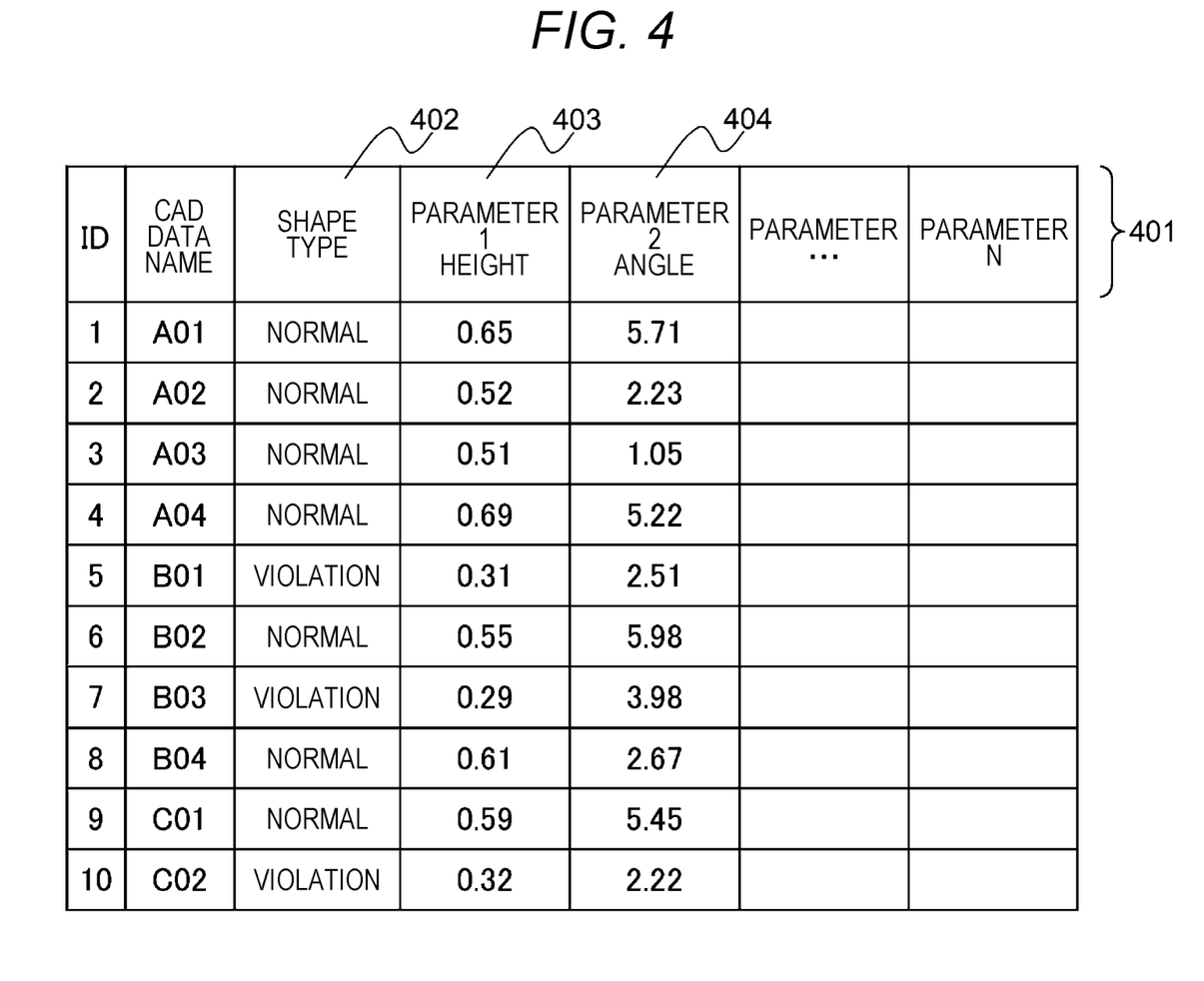
FIG. 4 is a diagram for explaining an example of a parameter table in which a parameter acquisition unit acquires parameters from target CAD data.

The acquired parameters are stored, for example, in a parameter table 122 of the storage unit 120 in a table structure 401 as illustrated in FIG. 4. Further, "normal" or "violation" is stored in a shape type 402 column as information for identifying the normal CAD data and the violation CAD data. The door handle mounting "height" 403 is registered in parameter 1 of FIG. 4, and the door handle "angle" 404 is registered in parameter 2. Further, in the above example, the procedure for acquiring only two types of parameters, "height" and "angle", is illustrated. However, for example, parameters may be acquired multiple times if there are multiple types such as the "curvature" of the door handle mounting surface, the "plate thickness", and the "material" of the door.

(5) Threshold Analysis Unit 115

The threshold analysis unit 115 calculates the statistical value of the parameter based on the statistical method, and calculates it as a threshold as a candidate for the design rule. The calculation of statistical values may be performed using the data mining represented by summary statistics such as maximum value, minimum value, standard deviation, association analysis, and cluster analysis, and a known statistical analysis method represented by multiple regression analysis, covariance structure analysis, and principal component analysis. Various statistics are analyzed by combining these methods.

When acquiring the threshold, for example, the influence degree of the parameter in the violation CAD data is calculated, and the threshold is calculated from the relationship of the parameters having a high influence degree on the violation. Further, the thresholds that are candidates for design rules may be quantified using a cluster analysis method such as a support vector machine (hereinafter, SVM) for a scatter diagram created using the above-mentioned parameters having the influence degree.

With only the shape of the normal CAD data, there is a risk that parameters determined subordinately from the influence of adjacent parameters and parameters used unintentionally from past models by the designer for a while are also ruled as thresholds for design rules. As a result, the design rules that are originally useful to the designer may be unused.

In this embodiment, by adding the violation CAD data, the threshold can be clarified from the parameter candidates that can be the basis of the violation from the above-mentioned analysis of the influence degree and SVM. Also, when performing the cluster analysis such as SVM, if it is not possible to cluster so that the parameters of the normal CAD data and the violation CAD data are mixed and distributed, it is unlikely that the designer is designing with the parameters intended. On the other hand, if clustering is possible, the designer can determine that the parameters are likely to be determined intentionally. As a result, by setting a threshold between the range that has a record in the past and the range that violates the past, it is possible to present the threshold closer to the limit design to the designer.

(6) Threshold Visualization Unit 116

Figure 9:
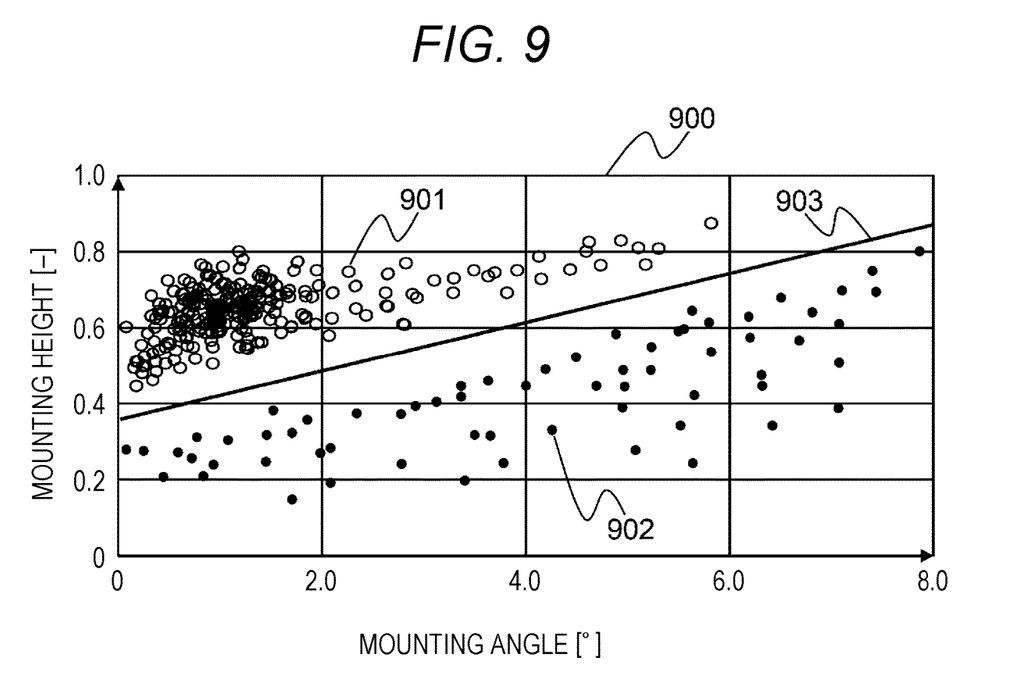
FIG. 9 is a diagram for explaining an example of a boundary line in which a scatter diagram of normal CAD data and violation CAD data is created on a two-dimensional coordinate system of parameters specified by a user and two groups are clustered.

The threshold visualization unit 116 visualizes the threshold calculated by the threshold analysis unit 115 to the output unit 140. A graph such as a histogram and a scatter diagram according to various statistics is displayed. For example, the graph illustrated in FIG. 9 is displayed. This visualization gives designers a quantitative idea of the design range of mounting heights and mounting angles of the door handle.

(7) Design Rule Registration Unit 117

When the user (evaluator) determines the threshold displayed on the output unit 140 by the threshold visualization unit 116 and determines that the threshold should be registered as a design rule, the input unit 130 instructs the registration. The design rule registration unit 117 registers the threshold in the design rule database 180 according to the instruction by the user.

Since this design support device displays statistical values from multiple CAD data, it is basically desirable to have a large number of data, but it is desirable to exclude the CAD data that is clearly determined to be useless (for example, too old CAD data) in advance.

Next, an example of the processing procedure and the data flow using the design support device will be described with reference to FIGS. 5A to 10. An example of the processing procedure for quantifying the threshold of the design rule and the registration process by the design support device is illustrated in the flowchart of FIG. 8.

Figure 8:
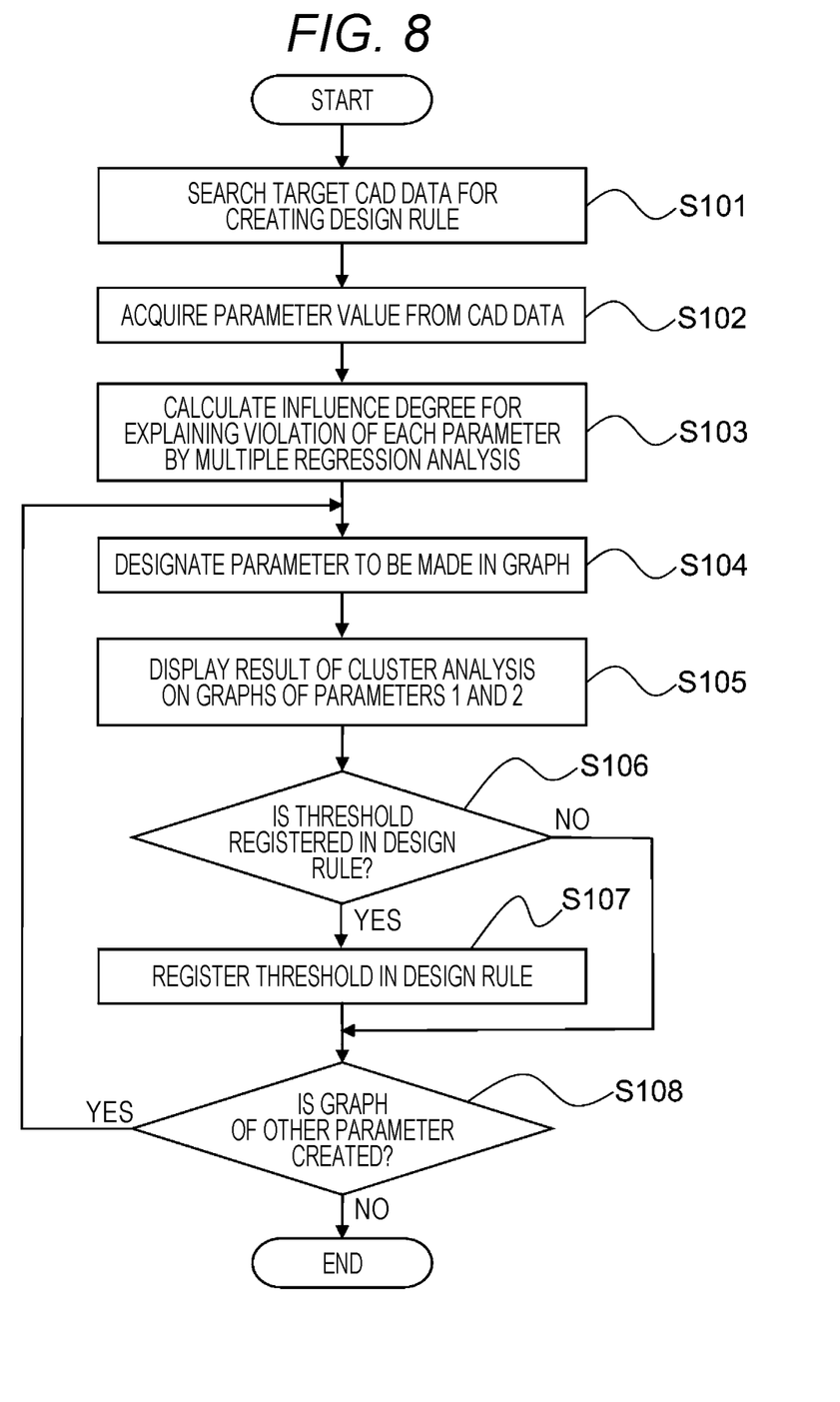
FIG. 8 is a flowchart for explaining an example of the flow of a processing procedure of quantifying a threshold of the design rule by the device and a registration process.

In Step S101 of FIG. 8, the user (evaluator) instructs the input unit 130 to start the process of quantifying the threshold of the intended design rule.

Hereinafter, an example of a design rule regarding "the door handle for automobiles should be arranged at a position where it is easy to open and close" will be described.

Normally, the door handle is operated by a wide range of generations from small children to adults, so if they are too low or too high, they are difficult to operate when opening and closing, which is inconvenient. Also, if the handle is close to a hinge part of the door, a large force is required to operate the handle to open and close, so it is necessary to install it in a well-balanced position. In addition, since the handle itself needs to be shaped and sized so that it is easy to grip, it is necessary to consider the design of the handle itself in addition to the mounting position. In addition, since the height of the vehicle, the design of the door, the opening/closing method, etc. differ depending on the vehicle type, it is necessary to design according to the vehicle type.

The user (evaluator) specifies the CAD data to be searched including the door handle by designating the attribute information such as the vehicle type and the destination to be the target of the design rule. The CAD data search unit 113 searches the corresponding normal CAD data and the violation CAD data from the three-dimensional CAD database 170, and stores them in the search CAD data 121.

In Step S102, the user (evaluator) designates parameters to be acquired from the searched CAD data using the input unit 130. The parameter acquisition unit 114 acquires the parameters from the search CAD data according to the user's designation.

Figure 5A:
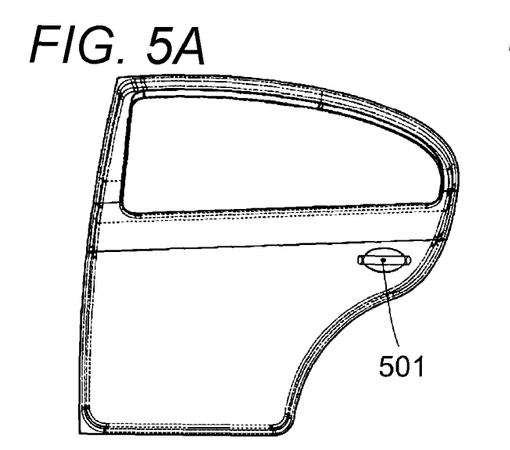
FIGS. 5A to 5F are diagrams for explaining an example of typical six pieces of door CAD data.
Figure 5B:
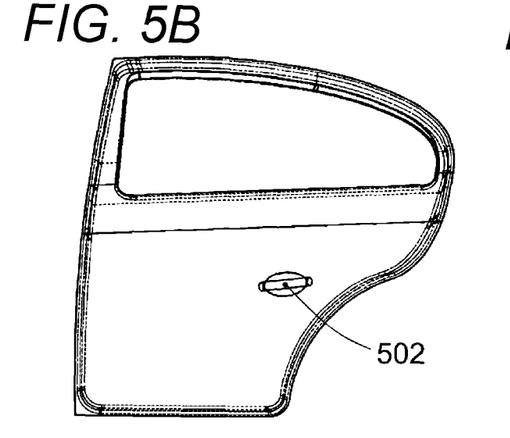
Figure 5C:
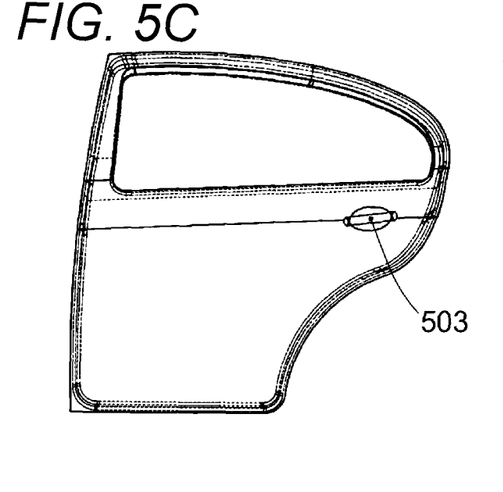
Figure 5D:
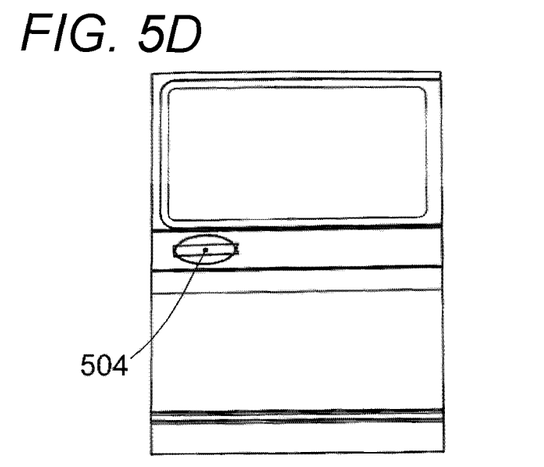
Figure 5E:
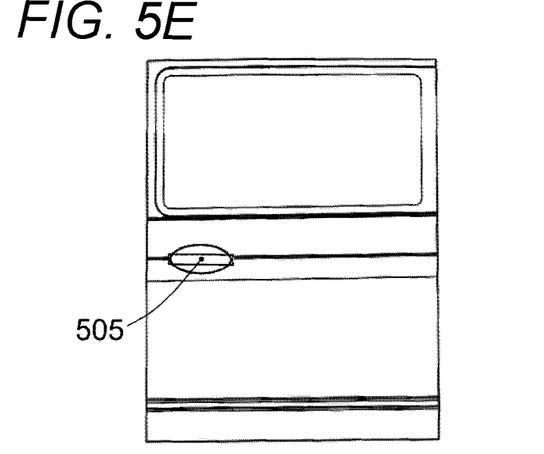
Figure 5F:
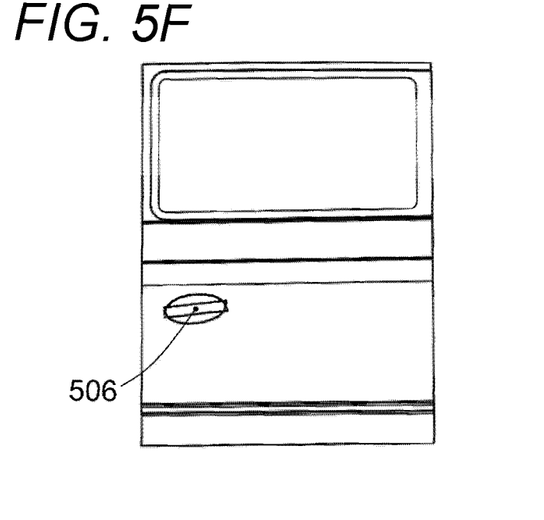

FIGS. 5A to 5F illustrate examples of six pieces of typical door CAD data searched. FIGS. 5A to 5C are general sedan type doors, while FIGS. 5D to 5F are wagon type doors. Reference numerals 501 to 506 indicate the center positions of the door handles. At this time, it is assumed that the door handle positions of 502 and 506 are determined to be violations, and the door CAD data of FIGS. 5B and 5F is registered as violation CAD data by the violation data registration unit 112.

For each searched CAD data, the parameter acquisition unit 114 processes the procedure from Step. 1 to Step. 6 illustrated below.

Step. 1 Search for a door.
Step. 2 Search for a door handle from the door.
Step. 3 Calculate the LWH dimensions of the door length (dimension in the direction of travel), width (dimension in the thickness direction of the door cross section), and height (dimension in the height direction from the lower end to the upper end of the door).
Step. 4 Calculate the height of the door handle (the height dimension from the lower end of the door to the center of the door handle).
Step. 5 Calculate the mounting height of the door handle (expressed as a dimensionless relative height) from Steps. 3 and 4.
Step. 6 Calculate the mounting angle of the door handle.

When searching for the door handle from the entire door in Step. 2, the partial shape is recognized by using the similar partial shape search technique described in the following technical document.

[Technical Document] Onodera et al., Development of mesh generation technique reusing proven analysis models by similar sub-part search, JSME Vol. 83, No. 853, 2017

In order to be able to compare multiple different CAD data, the height of the entire door in Step. 3 and the height of the door handle in Step. 4 are used to calculate a dimensionless relative mounting height in Step. 5. Next, in Step. 6, the mounting angle of the door handle is calculated when the horizontal direction is zero degree. The definition of this procedure may be, for example, the procedure of specifying the target part to be measured and acquiring the parameters using the API (Application Program Interface) and macro function installed in the standard functions of many three-dimensional CAD software. The parameters acquired by Steps. 1 to 6 above have the table structure illustrated in FIG. 6. At this time, the violation CAD data 5B2 and 5F6 have the violation stored in the shape type 601.

Figure 6:
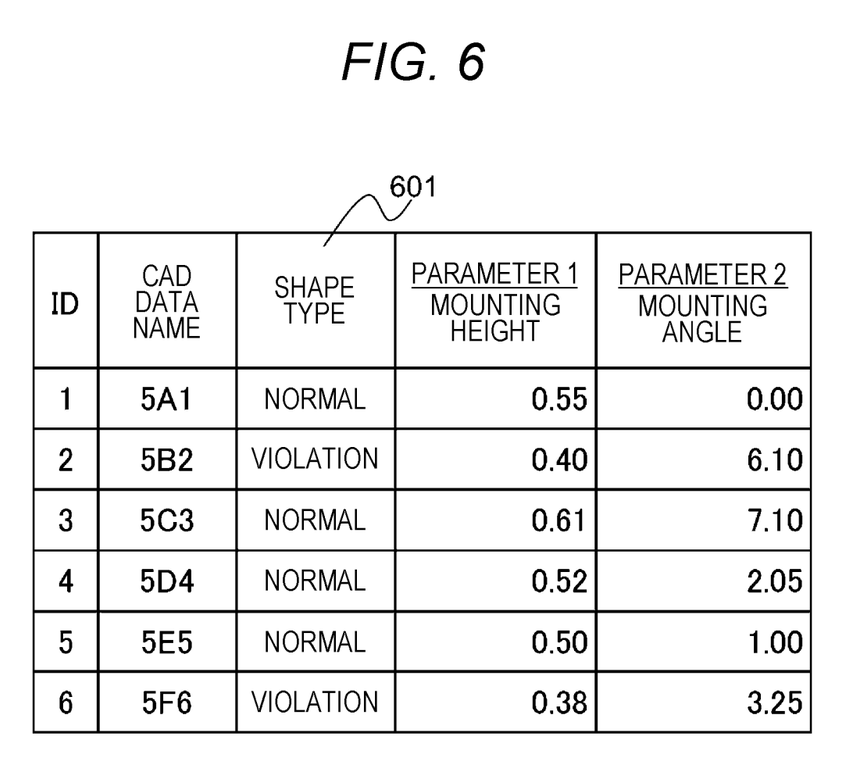
FIG. 6 is a diagram for explaining an example of a parameter table in which parameters are acquired from the six pieces of door CAD data illustrated in FIGS. 5A to 5F.

These parameters may be instructed based on the know-how when useful parameters or the like are stored as design know-how in advance, or a plurality of parameters or all the parameters that can be instructed may be acquired by calculation. In FIG. 6, two typical types related to the door handle are illustrated, but other parameters such as the following can be acquired.

Figure 7:
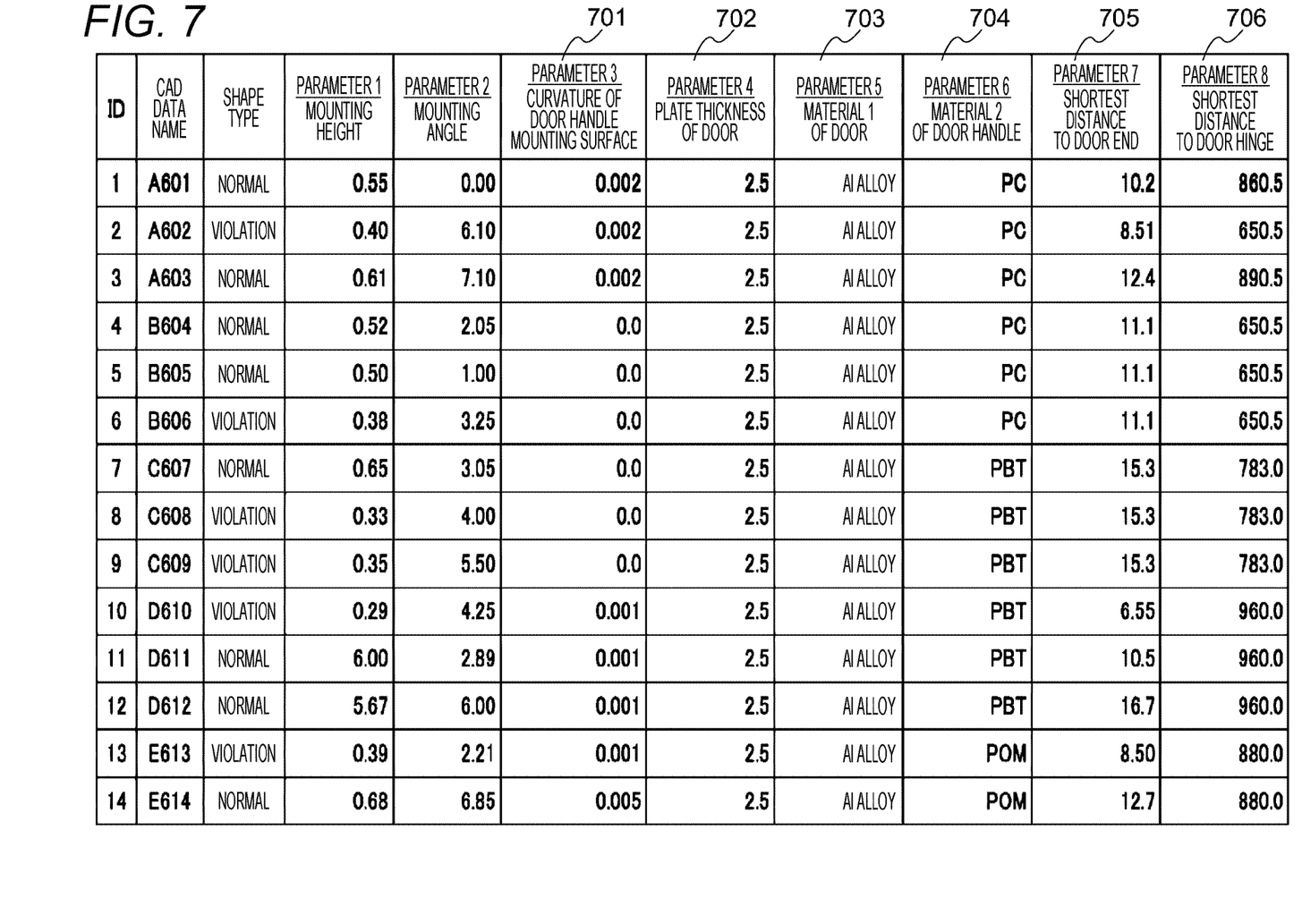
FIG. 7 is a diagram for explaining an example of a parameter table in which parameters are acquired from door CAD data by the parameter acquisition unit.

FIG. 7 illustrates an example of a table structure that includes the parameter groups (1) to (5).

(1) Curvature 701 of door handle placement surface (curvature at the mounting surface position)
(2) Plate thickness 702 of door
(3) Material 703 of door, material 704 of door handle
(4) Shortest distance 705 from the center of the door handle to the end surface of the door
(5) Shortest distance 706 from the center of the door handle to the door hinge The parameter acquisition unit 114 sets the shape type column to "normal" for the normal CAD data and the shape type column to "violation" for the violation CAD data, and stores the parameters acquired from each CAD data to the table structures illustrated in FIGS. 6 and 7 and in the parameter table 122 of the storage unit 120.

In Step S103 of FIG. 8, the threshold analysis unit 115 reads out the parameter table 122 stored in S102 and calculates the statistical value of the parameter. Since there are various statistical methods for calculating statistical values, an example will be described.

The multiple regression analysis is calculated by substituting the parameter values of each CAD data illustrated in FIG. 7 into an objective variable Y and an explanatory variable X of the multiple regression equation represented by the following Expression (1).

[Math. 1]

$$Y = b_1 X_1 + b_2 X_2 + b_3 X_3 + b_4 X_4 \ldots + b_0 \qquad (1)$$

Here, Y is an objective variable to be predicted, X is an explanatory variable used to predict Y, and the constants $b_1$ and $b_2$ that precede X are coefficients called partial regression coefficients.

In each CAD data of FIG. 7, if the shape type is "violation", the objective variable Y is set to "1", and if the shape type is "normal", the objective variable Y is set to "−1", and the values of parameters 1 to 8 are substituted to the explanatory variables X1 to X8 to calculate the multiple regression analysis so as to estimate the partial regression coefficients $b_1, \ldots, b_8$. However, in this embodiment, a standard partial regression coefficient obtained by standardizing each variable to have an average of 0 and a variance of 1 is used in order to remove the influence caused by the difference in variance of each explanatory variable, so that the value of the influence degree t for explaining the violation of each parameter (explanatory variable) is calculated and stored in a threshold analysis result 123.

In S103, the threshold analysis unit 115 displays a list of the values of the influence degree t explaining the violation of each calculated parameter (explanatory variable) in the output unit 140, and inquires the user (evaluator) of a threshold to be calculated in a combination of some parameters.

In Step S104 of FIG. 8, the user (evaluator) instructs, for example, to create a graph of the parameter having the maximum value of the influence degree t and the parameter having the next highest influence degree to explain the violation. The combination of parameters designated by the user (evaluator) is arbitrary.

In Step S105, the threshold analysis unit 115 creates a scatter diagram as illustrated in FIG. 9 that plots all the CAD data stored in the parameter table 122 onto the two-dimensional coordinate system with one parameter on the vertical axis and the other parameter on the horizontal axis according to the combination of parameters designated by the user (evaluator).

A cluster analysis is performed on the obtained scatter diagram of FIG. 9. Linear data (identification line) 903 illustrated in FIG. 9 is the result of cluster analysis using an SVM or the like that can handle classification problems. In SVM, cluster two groups, a normal CAD data group (represented by white circle ○, and given a value of 1) 901 and a violation CAD data group (represented by black circle ●, and given a value of −1) 902 are linearly separated with the linear data (boundary line). In SVM, the farthest part (maximum margin) between the two groups, the normal CAD data group and the violation CAD data group, is found, and the boundary line represented by Expression (2) is drawn in the middle.

[Math. 2]

$$f(x) = \omega x + b \quad (2)$$

Here, the boundary line f(x) has a slope co and an intercept b. Margin maximization means calculating the boundary between both groups by obtaining ω that maximizes the shortest distance between the data points of each group and this boundary line.

The threshold analysis unit 115 stores the created scatter diagram and boundary line data in the threshold analysis result 123 of the storage unit 120.

Figure 10:
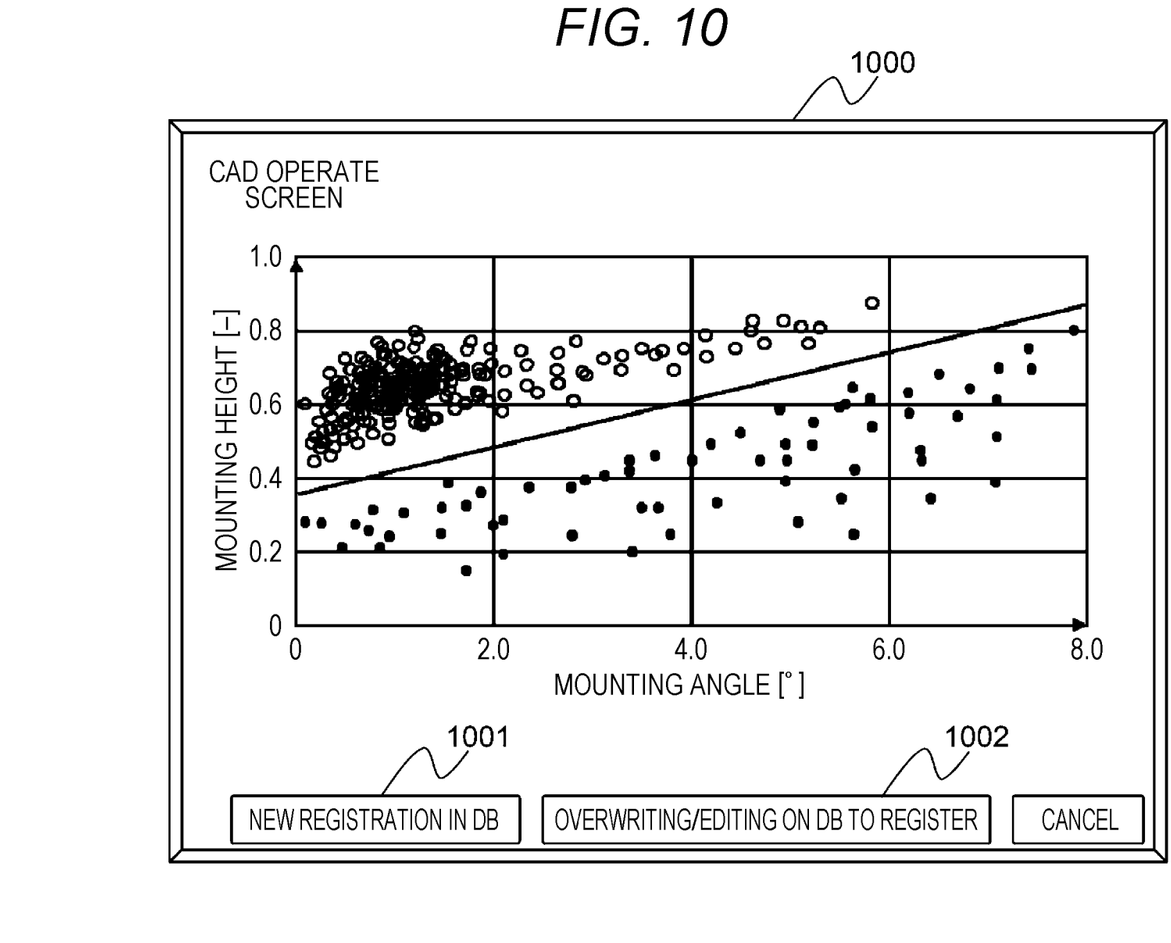
FIG. 10 is a diagram for explaining a screen example in which the graph of FIG. 9 is presented to a user and the user determines whether to register a threshold in a design rule database.

The threshold visualization unit 116 displays the threshold analysis result 123 in the output unit 140 in a screen 1000 as illustrated in FIG. 10.

In Step S106, the user (evaluator) determines whether the boundary line displayed on the screen 1000 in S105 is appropriate as a threshold for identifying the normal CAD data group (normal cluster) and the violation CAD data group (violation cluster) in the coordinate system of parameters of the designated combination, and should be registered as a design rule. The user (evaluator) responds to the threshold visualization unit 116 according to the determination result.

In Step S107, for example, when the user (evaluator) presses a button 1001 for registering the threshold as a new design rule in S106, or when the threshold When the button 1002 for overwriting or editing and registering the threshold is pressed if the threshold is already registered in the design rule database 180, the design rule registration unit 117 registers the coordinate system of parameters of the displayed combination and the boundary line in the design rule database 180 as the thresholds.

In Step S108, whether the user (evaluator) determines whether to calculate the threshold in the combination of parameters other than the combination of the already selected parameters in consideration of a list of values of the influence degree t of each parameter calculated in S103. If YES, the process moves to S104. If NO, the process of quantifying the threshold of the design rule ends.

In addition, this design support device can use the obtained threshold as a threshold for determining violation of a software execution file (XML file, etc.) to automatically check on CAD, and can support the execution of a shape check.

Depending on the execution result of this shape check, the status of the violated portion of the execution result can be switched in an output display method and colors (there is a possibility of violation and checking is needed, and there is a completely violated portion and shape change is required) by comparing the threshold area of the violation CAD data and the threshold area of the boundary between the normal CAD data and the violation CAD data according to this violation value.

As described above, it is possible to efficiently quantify an ambiguous design rule by statistically calculating and visualizing the possible range of the threshold of the design rule from the parameters of the normal CAD data and the violation CAD data.

What is claimed is:

1. A design support device, comprising:
a processor;
a display coupled to the processor;
a design rule database coupled to the processor; and
a memory coupled to the processor that stores instructions that when executed by the processor configure the processor to:
receive an input predetermined normal CAD data determined to be normal and predetermined violation CAD data determined to have a violated portion,
acquire attribute information including a vehicle type, a geographical region of the vehicle and a target object of a rule to be quantified,
search the normal CAD data and the violation CAD data based on the attribute information and the target object,
receive an input of a plurality of input parameters and acquire a plurality of numerical values of the acquired input parameters related to the design rule from the searched normal CAD data and the violation CAD data, and store the numerical values of the parameters in a table for each of the normal CAD data and violation CAD data,
perform a multiple regression analysis on the numerical values of the parameters stored in the table to calculate a value of an influence degree t that indicates a violation of each,
display, on the display, a list of the values of the influence degree t of each parameter,
receive a selection of a combination of two parameters having a highest and second highest value, respectively, of the influence degree t,
determine a scatter diagram plotting normal CAD data and violation CAD data to be evaluated based on the numerical values of the selected combination of the two parameters,
perform a cluster analysis on the scatter diagram and determine a boundary line,
simultaneously display, on the display, the scatter diagram and the boundary line on a two-dimensional coordinate system, and
register the coordinate system of parameters of the displayed combination of parameters and the boundary line as a threshold of a design rule in the design rule database.

2. The design support device according to claim 1, wherein the processor is configured to:
receive a definition of a procedure for measuring a parameter, and
measure the parameter in the defined procedure to obtain the numerical value of the parameter.

3. The design support device according to claim 1, wherein the processor is configured to calculate the value of the influence degree t explaining the violation of each parameter by substituting each parameter acquired from the normal CAD data and the violation CAD data to a multiple regression equation to calculate the multiple regression analysis.

4. The design support device according to claim 1, wherein each parameter is one of dimensional parameters including as length, distance, thickness, angle, radius, diameter, curvature, position, and orientation, shape characteristic parameters including volume, area, center of gravity, and secondary moment of cross section, attribute parameters including material, material constant, surface treatment, manufacturing base, shipping area, supplier, and cost, and number parameters including the number of feature shapes and the number of interferences.

5. The design support device according to claim 1, wherein in the cluster analysis, a farthest part (maximum margin) between two groups, a plotted normal CAD data group and a plotted violation CAD data group is found, and the boundary line is determined to be in the middle thereof.

6. The design support device according to claim 1, wherein an obtained threshold is used as a threshold for determining violation of a software execution file to automatically check on CAD, and a shape check can be supported.

7. The design support device according to claim 6, wherein depending on an execution result of the shape check, a status of a violated portion of the execution result is switched in an output display method and colors indicating that there is a possibility of violation and checking is needed, or that there is a completely violated portion and shape change is required by comparing a threshold area of the violation CAD data and a threshold area of the boundary between the normal CAD data and the violation CAD data according to this violation value.

8. The design support device according to claim 1, wherein, violation CAD data includes CAD data determined to have a problem in manufacturability from an execution result of software for automatically checking manufacturability or a manufacturing simulator on CAD.

\* \* \* \* \*